(12) United States Patent
Ejerhed

(10) Patent No.: US 6,754,617 B1
(45) Date of Patent: Jun. 22, 2004

(54) METHOD FOR AUTOMATICALLY DETERMINING SOLID COMPOUND WORDS

(75) Inventor: Eva Ingegerd Ejerhed, Stockholm (SE)

(73) Assignee: Hapax Limited, London (GB)

( * ) Notice: Subject to any disclaimer, the term of this patent is extended or adjusted under 35 U.S.C. 154(b) by 610 days.

(21) Appl. No.: 09/610,688

(22) Filed: Jul. 7, 2000

(30) Foreign Application Priority Data

Jul. 6, 2000 (SE) .............................................. 0002550

(51) Int. Cl.⁷ .............................................. G06F 17/27
(52) U.S. Cl. ........................................ 704/9; 705/531
(58) Field of Search ................... 704/1, 9, 10; 715/530, 715/531, 532, 533

(56) References Cited

U.S. PATENT DOCUMENTS

| | | | |
|---|---|---|---|
| 4,672,571 A | | 6/1987 | Bass et al. |
| 4,777,617 A | * | 10/1988 | Frisch et al. .................... 704/8 |
| 4,873,634 A | * | 10/1989 | Frisch et al. ................. 707/533 |
| 5,029,084 A | * | 7/1991 | Morahasi et al. ............... 704/9 |
| 5,065,318 A | * | 11/1991 | Kugimiya et al. ............... 704/6 |
| 5,225,981 A | | 7/1993 | Yokogawa |
| 5,754,972 A | * | 5/1998 | Baker et al. ................. 704/200 |
| 5,799,274 A | * | 8/1998 | Kuroda ........................ 704/239 |
| 5,867,812 A | | 2/1999 | Sassano |
| 5,963,893 A | * | 10/1999 | Halstead, Jr. et al. ........... 704/9 |
| 6,349,282 B1 | * | 2/2002 | Van Aelten et al. ......... 704/257 |

FOREIGN PATENT DOCUMENTS

| | | |
|---|---|---|
| EP | 0 281 742 A2 | 9/1988 |
| EP | 0 538 617 A2 | 4/1993 |

OTHER PUBLICATIONS

"Morphology and Computation", Richard Sproat, published by Massachusetts Institute of Technology, pp. 184 to 189 (1992).

* cited by examiner

Primary Examiner—Patrick N. Edouard
(74) Attorney, Agent, or Firm—Burns, Doane, Swecker & Mathis, L.L.P.

(57) ABSTRACT

A method for automatic determination whether a word type is a solid compound word is disclosed. In the method a word type is looked up in an electronically stored list of known word types. The list comprises an indication for each known word type of whether or not it is a known solid compound word. If the word type is found in the electronically stored list of known word types, it is determined whether the word type is a known solid compound word or not in accordance with the indication in the electronically stored list of known word types. If the word type is not found in the electronically stored list of known word types, the word type is divided into a prefix and a suffix. The prefix is looked up in an electronically stored list of known prefixes of solid compound words of a word class and the suffix is looked up in an electronically stored list of known suffixes of solid compound words of said word class. These look-ups are done for all possible divisions of the word type. If a prefix, associated with a division, is found in the electronically stored list of known prefixes of solid compound words of the word class and a suffix, associated with the division, is found in the electronically stored list of known suffixes of solid compound words of the word class, it is determined that the word type is a solid compound word of the word class. If the word type has not been determined to be a solid compound word, the look-up and determination is repeated for each of a number of different word classes.

11 Claims, 3 Drawing Sheets

METHOD FOR AUTOMATICALLY DETERMINING SOLID COMPOUND WORDS

TECHNICAL FIELD OF THE INVENTION

The present invention generally relates to the area of automatic analysis of text, and more specifically to a method for automatic determination of whether a word typo is a solid compound word.

BACKGROUND OF THE INVENTION

The recognition of compound words and their constituents is essential in many applications of automatic text analysis, since it is needed for determining the word class of a compound word, matching the compound word with other words etc. The recognition of compound words and their constituents is especially important in languages, such as German, Swedish, Dutch etc., where compound words can be generated that do not include a blank space between their constituents, so called solid compound words, A solid compound word is thus a solid string of characters where the constituents of the solid compound word may be separated by hyphens or not. One reason why it is important to recognize these solid compound words and their constituents is that the number of compound words that can be generated is immense and thus, it is virtually impossible to store all possible compound words. Thus, in order to facilitate a correct analysis of solid compound words, for example within text analysis, these solid compound words and their constituents need to be recognized. For languages in which constituents of compound words are separated by blank spaces, so called open compound words, recognition of compound words is not as difficult and the decomposition of them into their constituents is an easy task.

A problem in known methods for recognition of compound words and their constituents is that these often lead to many different possible segmentations of one single compound word. In these cases there is no methodology to identify the most probable segmentation of the word. Furthermore, the known methods only give the ultimate constituents of a compound word and not their structural relations (modifier-head relations).

An important reason to why it is difficult to recognize solid compound words and their constituents is that there are no regular rules governing whether or not there is a joining clement, and which joining element should be used when a solid compound word is formed. Thus, solid compound words and their constituents can not be recognized by just identifying joining elements. On the other hand, due to the fact that the number of solid compound words that can be generated is so immense, there is no possibility of storing all possible combinations of constituents. Even though a large number of known solid compound words has been stored, the risk of encountering an unknown solid compound word would still be very high. Furthermore, the generation of compound words without spaces between their constituents may give rise to segmentation ambiguities that arc not possible to resolve using known automatic methods.

SUMMARY OF THE INVENTION

The object of the invention is to provide a method for automatic recognition of whether a word type is a solid compound word that is not subject to the foregoing problems associated with existing methods for this task. Thus, a method for automatic determination whether a word type is a solid compound word or not is provided, which method significantly reduces the number of stored solid compound words needed and which gives a deterministic result.

The present invention is based on the recognition that solid compound words can be divided into groups according to their word class and that, by using an iterative and hierarchical method, solid compound words can be recognized using less volume of stored information and the result will be deterministic. Furthermore, the present invention is based on the recognition that, by storing, for the majority of the solid compound words, only a prefix and a suffix and not every possible combination of them, the amount of information that needs to be stored can be reduced significantly.

According to an aspect of the invention a method is provided for automatic determination whether a word type is a solid compound word or not. In the method a word type is looked up in an electronically stored list of known word types. The list comprises an indication for each known word type of whether it is a known solid compound word or not. If said word type is in the list of known word types, it is determined whether the word type is a known solid compound word or not by look-up in the list of known word types. If the word type is not in the list of known word types, the word type is exhaustively divided into a prefix and a suffix and the prefix and the suffix are looked up in an electronically stored list of known prefixes of solid compound words of a word class, and an electronically stored list of known suffixes of solid compound words of said word class, respectively. This look-up is done for all possible divisions of the word type into a prefix and a suffix. If a prefix, associated with a division, is in the list of known prefixes of solid compound words of the word class and a suffix, associated with the same division, is in the list of known suffixes of solid compound words of the word class, then it is determined that the word type is a solid compound word of the word class. If the word type is not a known word type and if it has not been determined to be a solid compound word, the look-up of prefixes and suffixes is then repeated for a new word class. This is repeated until the word type has been determined to be a solid compound word of a given word class, or until all of the word classes to be tested have been tested.

By first looking up the word type in a list of known word types and determining if the word type is a known word type word, known word types will not have to be subjected to the subsequent analysis of the method. This is advantageous, since it will eliminate the risk of a known word type that is not a solid compound word being erroneously identified as a solid compound word in the later analysis.

As for the further analysis that is done for word types that are not known word types, this analysis is divided into an analysis for each one of a number of different word classes. By looking up prefixes and suffixes in lists comprising known prefixes and suffixes, respectively, associated to one word class at a time, the fact that solid compound words are created according to different rules for different word classes can be utilized. Together with the fact that the look-up and determination will only be done for a word class as long as the word has not been determined to be a solid compound word of another word class, this will decrease the risk of a word type being erroneously determined to be a solid compound word of one word class when it is in fact a solid compound word of another word class. Furthermore, this will eliminate the risk of a word type being erroneously determined to be a solid compound word of two or more word classes simultaneously.

Furthermore, by doing the look-up of prefixes and suffixes in lists comprising known prefixes and suffixes, respectively, the amount of information that needs to be stored in a full form word list is reduced in relation to the alternative where all possible combinations of prefixes and suffixes are stored.

In one embodiment of the method according to the invention the list of known word types further comprises an indication for each known solid compound word of its main division point, i.e. the point between two characters in the word type that divides the word type into its main constituents, For example a solid compound word that has two main constituents that are non-compound words the main division point is simply between these two constituents, whereas for a compound word that has two main constituents of which one is a compound word and the other is not, the main division point will be between the compound word and the non-compound word. In this embodiment it is determined, when the word type is found in said electronically stored list of known word types, whether the word type is a known solid compound word or not in accordance with the indication in said electronically stored list of known word types. If the word type is a known solid compound word, its main division point is found in the list of known solid compound words. Furthermore, if the word type has been determined to be a solid compound word of a word class, its main division point is determined to be between the prefix and the suffix that have been found in the list of known prefixes an the list of known suffixes, respectively, for this word class. By storing the main division point for known solid compound words, and known prefixes and suffixes for solid compound words of different word classes, the determining of the main division point gives an unambiguous result.

In another embodiment of the invention, the determination of a main division point, and thus the main constituents of a solid compound word, is extended with the determination of the binary division points internal to the main constituents. Thus if a word type has been found to be a solid compound word, and its main division point has been determined, the method is repeated for the main constituents of the solid compound word. In this way, it will be determined if the main constituents in turn are solid compound words, This is preferably done recursively until all of the found constituents of the word type are non-compound words. The result will then not only give all of the constituents of the word type, but also their structural relations (modifier-head relations).

Furthermore, in one embodiment, the electronically stored list of known word types is updated with said word type, an indication that said word type is a known solid compound word, and an indication of where the word type has its main division point, whenever a word type is determined to be a compound word that is not in the list of known word types. This is advantageous since look-up in the list of word types is much faster than decomposition and look-up of prefixes and suffixes. Furthermore, since only the compound words that have actually been observed are stored in the list of known words, the list of known word type will still include much less known word types than if all possible combination of prefixes and suffixes are stored in this list.

In yet another embodiment of the method according to the invention the steps of looking up of prefixes and suffixes, and determining that a word is a solid compound words of a word class are performed for word classes with more restricted combinatorial properties before they are preformed for word classes with less restrictive conbinatorial properties. Furthermore, when a word type is determined to be a solid compound word of a given word class it will not be subjected to any further analysis. Thus, the risk of a solid compound word of a word class with more restrictive combinatorial properties being erroneously determined to be a solid compound word of a word class with less restrictive combinatorial properties. Preferably, these steps are performed first for solid compound names, then for solid compound verbs, and finally for other solid compound words, such as compound nouns, adjectives, and participles.

BRIEF DESCRIPTION OF THE DRAWINGS

In the following, the present invention is illustrated by way of example and not limitation with reference to the accompanying drawings, in which.

DETAILED DESCRIPTION OF THE INVENTION

Figure 1:
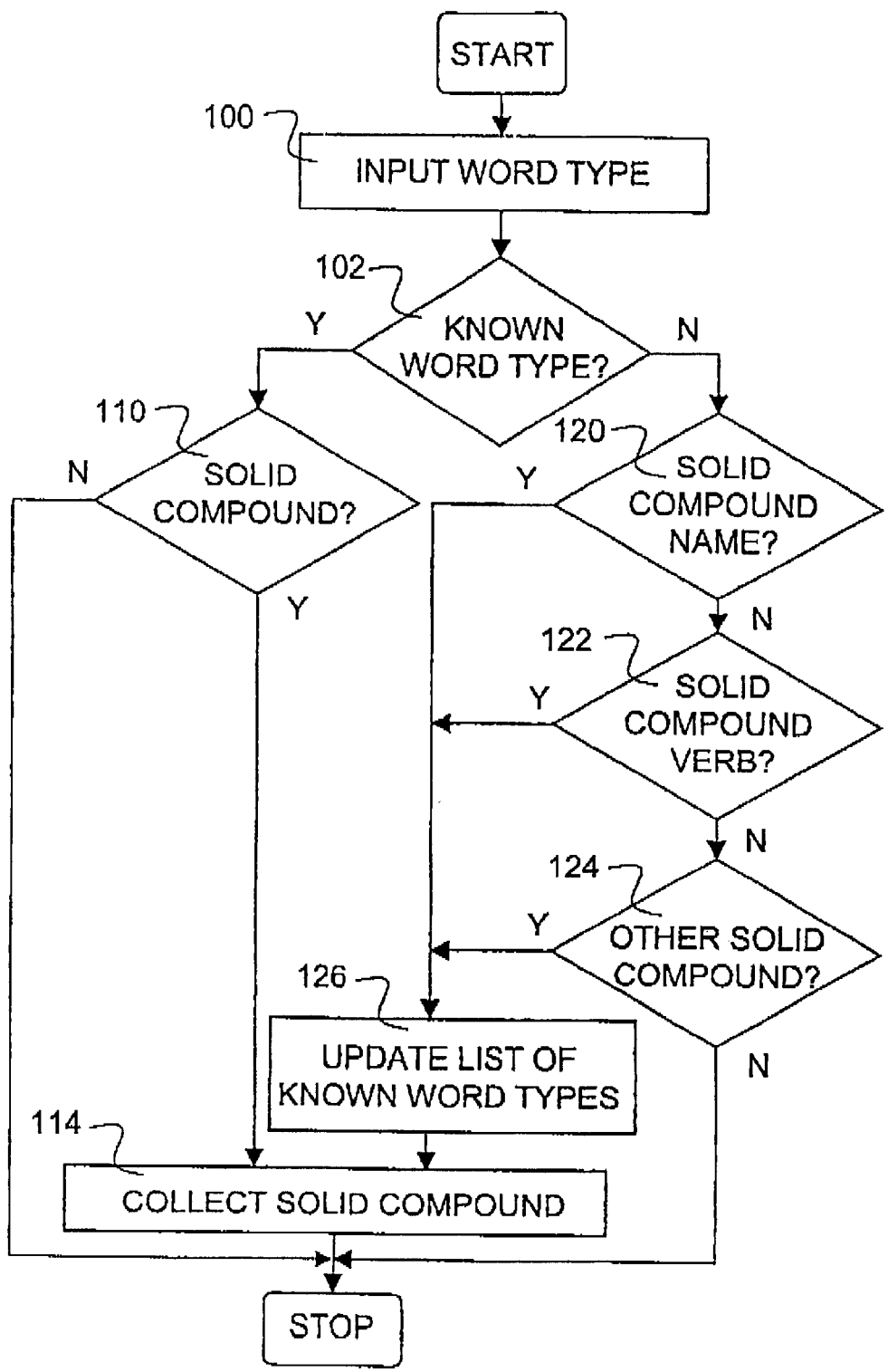
FIG. 1 is a flowchart of an embodiment of a method according to the invention.

In FIG. 1 a flowchart of an embodiment of a method according to the invention is shown. In the method it is determined whether a word type is a solid compound word or not, and, when it is a solid compound word, where its main division point is. In step 100 one word type of a list of word types is input and in step 102 the word type is looked up in a electronically stored list of known word types, i.e. observed word types. In addition to the known words, the list comprises an indication, for each known word, of whether the known word is a known solid compound word or not, and an indication, for each known solid compound word, of the location of its main division point. The look-up will either give a positive or a negative result depending on whether the word type is in the list or not. If the word type is in the list of known word types it is determined, in step 110, whether the word type is a known compound word or not by a look-up in the list of known word types. If the word type is not a known compound word it is determined that the word type is not a compound word. However, if the word type is a known compound word, the indication in the list of known compound words also gives the main division point of the word type, and the word type is collected in step 114 and the method is ended.

If the word type is not in the list of known word typesit is determined, in step 120 of FIG. 1, whether the word typo is a solid compound name. In this step the word type is divided into a prefix and a suffix. The division is first done between the first and the second character of the word type. Then, the prefix is looked up in an electronically stored list of known prefixes of solid compound names. Similarly, the suffix is looked up in an electronically stored list of known suffixes of solid compound names. If the prefix and the suffix are found in the list of known prefixes for solid compound names and the list of known suffixes for compound names, respectively, it is determined that the word type is a solid compound name. If the prefix is not found in the list of known prefixes for solid compound names or the suffix is not found in the list of known suffixes for solid compound names, the word type is divided into a new prefix and a new suffix. This division is repeated between the second and the third character of the word type. A look-up in the lists of known prefixes and suffixes of this new prefix and new suffix, respectively, is then performed. If the new prefix and the new suffix are found in the list of known prefixes for solid compound names and the list of known suffixes for solid compound names, respectively, it is determined that the word type is a solid compound name, If not, the word type is divided between the third and the fourth character. This iterative operation is continued until all divisions of the word type have been tested. Furthermore, when a prefix and a suffix are found in the list of known prefixes for solid compound names and the list of known suffixes for compound names, respectively, it is determined that the main division of the word type is between the found prefix an the found suffix.

If the word type is determined to be a solid compound name, the electronically stored list of known word types is updated, in step 126, with the word type and its main division point. After step 126 the word type is collected in step 114 of FIG. 1 and the method is ended. If the word type is not determined to be a solid compound name it is determined, in step 122, whether the word type is a solid compound verb. This is done in a manner similar to the determination in 120 with the difference that the look-up of prefixes and suffixes is done in a list of known prefixes for solid compound verbs and a list of prefixes for solid compound verbs, respectively.

If the word type is determined to be a solid compound verb, the electronically stored list of known word types is updated, in step 126, with the word type and its main division point. After step 126 the word type is is collected in step 114 of FIG. 1 and the method is ended. If the word type is not determined to be a solid compound verb, it is determined, in step 124, whether the word type is a solid compound word of another word class. This is done in a manner similar to the determination in 120 an 122 with the difference that the look-up of prefixes and suffixes is done in a list of known prefixes for solid compound words of another word class and a list of prefixes for solid compound words of another word class, respectively.

If the word type is determined to be a compound word of another word class, the electronically stored list of known word types is updated, in step 126, with the word type and its main division point. After step 126 the word type is collected in step 114 of FIG. 1 and the method is ended. If the word type is not determined to be a compound word of another word class the method is ended.

The steps 100–126 are then repeated for the next word type of the list of word types until it has been determined for each of the word types whether it is a compound word or not.

Note that the order in which the determination of whether the word type is a solid compound name, a solid compound verb or a solid compound word of another word class may be altered. However, the order described is the preferred one.

The lists of known prefixes and suffixes for compound words of the different word classes have initially been generated as the prefixes and suffixes of known, i.e. observed, compound words. A list of known prefixes can then be updated with prefixes of divisions in which these are not in the list of known prefixes while the corresponding suffixes are in the lists of known suffixes. Similarly, a list of known suffixes can then be updated with suffixes of divisions in which these are not in the list of known suffixes while the corresponding prefixes are in the lists of known suffixes. In the case where neither the prefix nor the suffix is found in the respecive list, the lists will not be updated.

In addition to just finding the main division point, as is done using the method described in FIG. 1, the method may be extended to also find subsidiary division points. This can easily be done by performing the steps in FIG. 1 for each main constituent of a solid compound word, where the main constituents are defined as the parts of a solid compound word that is before the main division point (prefix) and after the main division point (suffix), respectively. However, in order to improve the method to find subsidiary division points in constituents before the main division point, a separate list of known suffixes of prefixes of solid compound words is used for these. This is due to the fact that suffixes of prefixes have properties that differ from the properties of word final suffixes. The repetition is done recursively, i.e. if a prefix or a suffix has been determined to be a compound word, then the steps in FIG. 1 will be repeated for its constituents as well. This is continued until all constituents of the word type are non-compound words.

A method according to the invention, such as the method described with reference to FIG. 1, may be implemented in software as a computer program comprising computer-executable instructions for performing the steps, but it may as well be implemented in hardware using hard coded circuits for performing the steps.

Figure 2A:
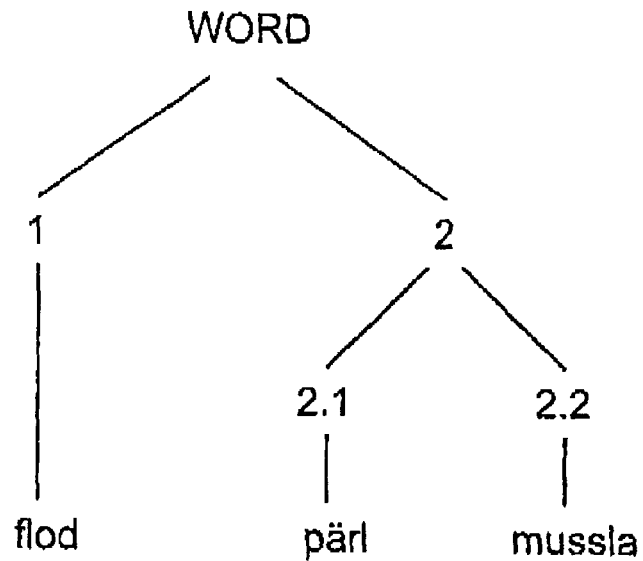
FIG. 2A and 2B illustrate the constituent structure of two examples of solid compound words.
Figure 2B:
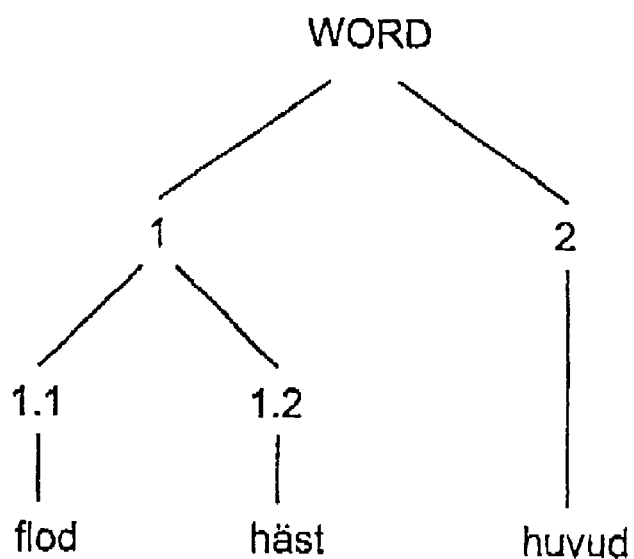

Turning now to FIG. 2A and FIG. 2B, they illustrate the constituent structure of two examples of solid compound words. The solid compound words shown are the Swedish words "flodpärlmussla", literally 'river' 'pearl' 'mussel', in FIG. 2A and "flodhästhuvud", literally 'river' 'horse' 'head', in FIG. 2B. The figures illustrate the result of using the method described with reference to FIG. 1, recursively in order to determine the main division point and subsidiary division points of a solid compound word.

In FIG. 2A the word "flodpärlmussla" has been determined to be a solid compound word with the main division point between "flod" and "pärlmussla" in a first repetition of the method described with reference to FIG. 1. Then, in repetitions of the method described with reference to FIG. 1, the main constituent "flod" has been determined not to be a solid compound word, and the constituent "pärlmussla" has been determined to be a solid compound word that has the constituents "pärl" and "mussla". This is illustrated by the binary tree in FIG. 2A. Finally, further repetitions of the method described with reference to FIG. 1 for the constituents "pärl" and "mussla" have shown that these are not compound words and thus the recursion is ended.

In FIG. 2B the word "flodhästhuvud" has been determined to be a solid compound word with the main division point between "flodhäst" and "huvud" in a first repetition of the method described with reference to FIG. 1. Then, in repetitions of the method described with reference to FIG. 1, the main constituent "flodhäst" has been determined to be a solid compound word that has the constituents "flod" and "häst", and the constituent "huvud" has been determined not to be a solid compound word. This is illustrated by the binary tree in FIG. 2B. Finally, further repetitions of the method described with reference to FIG. 1 for the constituents "flod" and "häst" have shown that these are not compound words and thus the recursion is ended.

Figure 3:
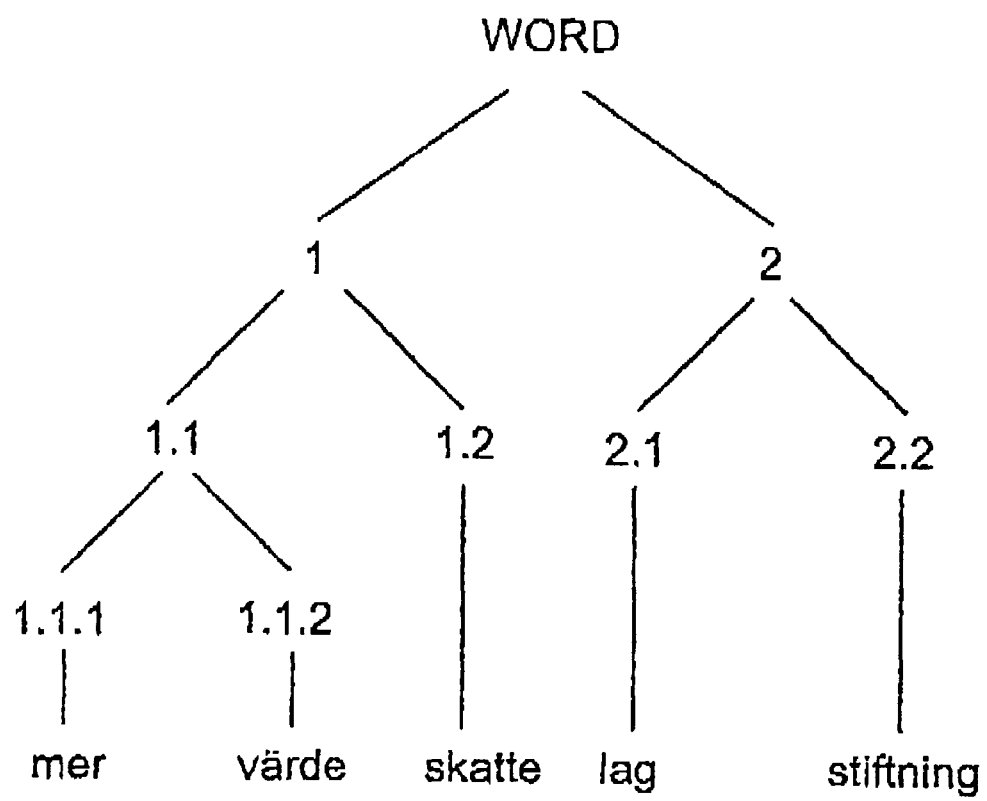
FIG. 3 illustrates the constituent structure of another example of a solid compound word.

In FIG. 3 a graphical illustration of the constituents of another example of a solid compound word is shown. The solid compound word shown is the Swedish word "mervärdeskattelagstiftning", literally 'added' 'value' 'tax' 'law' 'making'. The figure illustrates the result of using the method described with reference to FIG. 1, recursively in order to determine the main division point and subsidiary division points of a solid compound word. The word "mervärdeskattelagstiftning" has been determined to be a solid compound word with the main constituents "mervärdeskatte" and "lagstiftning" in a first repetition of the method described with reference to FIG. 1. Then, in repetitions of the method described with reference to FIG. 1, the main constituent "mervärdeskatte" has been determined to be a solid compound word that has the constituents "merv ärde" and "skatte", and the constituent "lagstiftning" has been determined to be a solid compound word that has the constituents "lag" and "stiftning". Furthermore, in another repetition the constituent "mervärde" has been determined to be a solid compound word that has the constituents "mer" and "varde". This Is illustrated by the binary tree in FIG. 3. Finally, further repetitions of the method described with reference to FIG. 1 for the constituents "mer", "värde", "skatte", "lag" and "stiftning" have shown that these are not compound words and thus the recursion is ended,

What is claimed is:

1. A method for automatic determination whether a word type is a solid compound word, comprising the steps of:
   a) looking up a word type in an electronically stored list of known word types that comprises an indication for each known word type of whether or not it is a know solid compound word and an indication for each known solid compound word of its main division point;
   b1) determining, when said word type is found in said electronically stored list of known word types, whether said word type is a known solid compound word or not in accordance with the indication in said electronically stored list of known word types;
   b2) determining, when said word type is a known solid compound word, that said word type has the main division point according to said list of known solid compound words;
   c) looking up, when said word type is not found in said electronically stored list of known word types, for each possible division of said word type into a prefix and a suffix, said prefix in an electronically stored list of known prefixes of solid compound words of a word class and said suffix in an electrically stored list of known suffixes of solid compound words of said word class;
   d1) determining, when a prefix, associated with a division, is found in said electronically stored list of known prefixes of solid compound words of said word class and a suffix, associated with said division, is found in said electronically stored list of known suffixes of solid compound words or said word class, that said word type is a solid compound word of said word class;
   d2) determining, when said word type is a solid compound word of said word class, that it has its main division point between said prefix and said suffix; and
   e) repeating, when said word type has not been determined to be a solid compound word, steps c), d1) and d2) for each of a number of different word classes.

2. The method according to claim 1, further comprising the step of:
   f) repeating, when said word type has been determined to be a solid compound word, steps a)–e) for said prefix of said word type;
   g) repeating, when said word type has been determined to be a solid compound word, steps a)–e) for said suffix of said word type;
   h) recursively repeating steps a)–e) for the prefix of a prefix that is a compound word until said prefix of a prefix is determined not to be a compound word;
   i) recursively repeating steps a)–e) for the suffix of a prefix that is a compound word until said suffix of a prefix is determined not to be a compound word;
   j) recursively repeating steps a)–e) for the prefix of a suffix that is a compound word until said prefix of a suffix is determined not to be a compound word; and
   k) recursively repeating steps a)–e) for the suffix of a suffix that is a compound word until said suffix of a suffix is determined not to be a compound word.

3. The method according to claim 1, further comprising the step of:
   1) updating, when said word type is determined to be a solid compound word of a given word class, said electronically stored list of known word types with said word type and with an indication that said word type is a known solid compound word.

4. The method according to claim 1, further comprising the step of:
   m) updating, when said word type is a solid compound word of a given word class, said electronically stored list of known word types with said word type, with an indication that said word type is a known solid compound word, and with an indication that said word type has its main division point between said prefix and said suffix.

5. The method according to claim 1, wherein, the look-up in step d) is done sequentially starting with a division of said word type between the first character and the second character of said word type and ending with a division of said word type between the penultimate character and the ultimate character of said word type.

6. The method according to claim 1, wherein steps c) and d) are performed for word classes with more restricted combinatorial properties before they are preformed for word classes with less restrictive combinatorial properties.

7. The method according to claim 1, wherein the steps c) and d) are performed first for solid compound names using an electronically stored list of known prefixes of solid compound names and an electronically stored list of known suffixes of solid compound names, then for solid compound verbs using an electronically stored list of known prefixes of solid compound verbs and an electronically stored list of known suffixes of solid compound verbs, and finally for other solid compound words using an electronically stored list of known prefixes of other solid compound words and an electronically stored list of known suffixes of other solid compound words.

8. A method for automatic determination whether a word type is a solid compound word, comprising the steps of:
   looking up a word type in an electronically stored list of known word types that comprises an indication for each know word type of whether it is a compound word or not and, if that is the case, a specification of its main division point;
   determining, when said word type is found in said electronically stored list of known word types, whether said word type is a known solid compound word, an if that is the case, that its main division point is the one according to said electronically stored list of known word types;
   looking up, when said word type is not found in said electronically stored list of known word types, for each possible division of said word type into a prefix and a suffix, said prefix in an electronically stored list of known prefixes of solid compound names and said suffix in an electronically stored list of known suffixes of solid compound names;
   determining, when a prefix, associated with a division, is found in said electronically stored list of known prefixes of solid compound names and a suffix, associated with said division, is found in said electronically stored list of known suffixes of solid compound names, that said word type is a solid compound name and that its main division point is between said prefix and said suffix;

looking up, when said word type is not found in said electronically stored list of known word types and is not a solid compound name, for each possible division of said word type into a prefix and a suffix, said prefix in an electronically stored list of known prefixes of solid compound verbs and said suffix in an electronically stored list of known suffixes of solid compound verbs;

determining, when a prefix, associated with a division, is found in said electronically stored list of known prefixes of solid compound verbs and a suffix, associated with said division, is found in said electronically stored list of known suffixes of solid compound verbs, that said word type is a solid compound verb and that its main division point is between said prefix and said suffix;

looking up, when said word type is not found in said electronically stored list of known word types, is not a solid compound name, and is not a solid compound verb, for each possible division of said word type into a prefix and a suffix, said prefix in an electronically stored list of known prefixes of other solid compound words and said suffix in an electronically stored list of known suffixes of other solid compound words; and determining, when a prefix, associated with a division, is found in said electronically stored list of known prefixes of other solid compound words and a suffix, associated with said division, is found in said electronically stored list of known suffixes of other solid compound words, that said word type is an other solid compound word and that its main division point is between said prefix and said suffix.

9. A computer readable medium having computer-executable instructions for a general-purpose computer to perform the steps recited in claim 1.

10. A computer program comprising computer-executable instructions for performing the steps recited in claim 1.

11. An apparatus comprising means for performing the steps recited in claim 1.

* * * * *